United States Patent
Oh et al.

(10) Patent No.: US 11,939,424 B2
(45) Date of Patent: Mar. 26, 2024

(54) COMPOSITION FOR LIQUID CRYSTAL POLYMER SYNTHESIS, LIQUID CRYSTAL POLYMER FOR ELECTRICAL/ELECTRONIC PRODUCTS, POLYMER RESIN COMPOSITION, AND MOLDED PRODUCT USING THE SAME

(71) Applicant: SK CHEMICALS CO., LTD., Gyeonggi-do (KR)

(72) Inventors: Kwang Sei Oh, Seoul (KR); Ji-Hoon Kim, Gyeonggi-do (KR); Jong-In Lee, Gyeonggi-do (KR); Sun-Hee Lee, Gyeonggi-do (KR); Myung-Se Lee, Gyeonggi-do (KR)

(73) Assignee: SK Chemicals Co., Ltd., Gyeonggi-do (KR)

( * ) Notice: Subject to any disclaimer, the term of this patent is extended or adjusted under 35 U.S.C. 154(b) by 0 days.

(21) Appl. No.: 16/620,033

(22) PCT Filed: May 29, 2018

(86) PCT No.: PCT/KR2018/006112
§ 371 (c)(1),
(2) Date: Dec. 6, 2019

(87) PCT Pub. No.: WO2018/225975
PCT Pub. Date: Dec. 13, 2018

(65) Prior Publication Data
US 2020/0102420 A1    Apr. 2, 2020

(30) Foreign Application Priority Data

Jun. 7, 2017 (KR) .......................... 10-2017-0070919
Dec. 6, 2017 (KR) .......................... 10-2017-0166961

(51) Int. Cl.
| | | |
|---|---|---|
| C08G 63/21 | (2006.01) | |
| C08G 63/19 | (2006.01) | |
| C09K 19/38 | (2006.01) | |
| C09K 19/52 | (2006.01) | |

(52) U.S. Cl.
CPC .............. *C08G 63/21* (2013.01); *C08G 63/19* (2013.01); *C09K 19/3809* (2013.01); *C09K 19/52* (2013.01)

(58) Field of Classification Search
CPC .... C08G 63/19; C08G 63/191; C08G 63/199; C08G 63/21; C08G 63/60; C08L 67/00; C09K 19/3809; C09K 19/52
See application file for complete search history.

(56) References Cited

U.S. PATENT DOCUMENTS

| | | | |
|---|---|---|---|
| 4,318,842 A * | 3/1982 | East | C08G 63/60 |
| | | | 524/605 |
| 4,342,862 A | 8/1982 | Jackson, Jr. et al. | |
| 4,355,133 A | 10/1982 | East et al. | |
| 4,803,235 A | 2/1989 | Okada | |
| 4,814,417 A * | 3/1989 | Sugimori | C08G 63/199 |
| | | | 528/125 |
| 5,747,175 A | 5/1998 | Dietz et al. | |
| 6,093,787 A | 7/2000 | Long et al. | |
| 6,153,722 A | 11/2000 | Schoenfeld et al. | |
| 2011/0233462 A1* | 9/2011 | Bu | C09K 19/3809 |
| | | | 252/299.5 |
| 2012/0119142 A1 | 5/2012 | Osato et al. | |
| 2014/0088287 A1 | 3/2014 | Nishimura et al. | |
| 2015/0038631 A1 | 2/2015 | Hamaguchi et al. | |
| 2016/0053107 A1* | 2/2016 | Mazahir | C08L 67/00 |
| | | | 525/397 |
| 2016/0053118 A1* | 2/2016 | Nair | C08L 79/08 |
| | | | 525/419 |
| 2016/0200977 A1 | 7/2016 | Lee et al. | |

FOREIGN PATENT DOCUMENTS

| | | |
|---|---|---|
| CN | 102449026 | 5/2012 |
| CN | 104144981 | 11/2014 |
| EP | 0213899 | 3/1987 |
| EP | 0949287 | 10/1999 |
| JP | S58-32630 | 2/1983 |
| JP | 2004-256656 | 9/2004 |
| JP | 2011-057976 | 3/2011 |
| JP | 2014-111753 | 6/2014 |
| KR | 10-2000-0005152 | 1/2000 |

(Continued)

OTHER PUBLICATIONS

Avraam I. Isayev "Liquid Crystalline Composite", pp. 1-19, 2012 Wiley Encyclopedia of Composites, Second Edition. (Year: 2012).*

(Continued)

*Primary Examiner* — Frances Tischler
*Assistant Examiner* — Gennadiy Mesh
(74) *Attorney, Agent, or Firm* — Sheridan Ross P.C.

(57) ABSTRACT

The present invention is a composition for liquid crystal polymer synthesis comprising an alicyclic dicarboxylic acid or its derivative (e.g., 1,4-cyclohexanedicarboxylic acid (CHDA)); an aromatic diol (e.g., hydroquinone (HQ)); an aromatic monocarboxylic acid having 7 to 10 carbon atoms and containing a hydroxyl group (e.g., 4-hydroxybenzoic acid, (HBA)); and an aromatic monocarboxylic acid having 11 to 20 carbon atoms and containing a hydroxyl group (e.g., 6-hydroxy-2-naphthalenecarboxylic acid (HNA)), and a liquid crystal polymer for electrical/electronic products, a polymer resin composition, and a molded product using the same.

2 Claims, No Drawings

(56) References Cited

FOREIGN PATENT DOCUMENTS

| KR | 10-2008-0062975 | 7/2008 |
|----|-----------------|--------|
| KR | 10-2014-0135953 | 11/2014 |
| KR | 10-2015-0037539 | 4/2015 |
| TW | 201105705 | 2/2011 |

OTHER PUBLICATIONS

H.C.Langellan et al "Crystallization of thermotropic liquid crystalline HBA/HNA copolymers", Polymer vol. 37 No. 25, pp. 5667-5680, 1996 (Year: 1996).*
Wang et al "Synthesis and Eutectic Behavior of Liquid Crystalline Copolyesters", Journal of Polymer Science: Part B: Polymer Physics, vol. 47, 2171-2177 (2009). (Year: 2009).*
Yoon et al "Advanced Polymerization and Properties of Biobased High Tg polyester of Isosorbide and 1,4-Cyclohexanedicarboxylic Acid", 2013 (Year: 2013).*
Extended Search Report for European Patent Application No. 18814287.1, dated Nov. 5, 2020, 7 pages.
International Search Report for International (PCT) Patent Application No. PCT/KR2018/006112, dated Sep. 7, 2018, 2 pages.
Higashi et al. "High-viscosity polyesters from secondary alicyclic 1,4-cyclohexanedicarboxylic acids and hydroquinones with thionyl chloride/pyridine condensing agent," Macromolecular Rapid Communications, 2000, vol. 21, pp. 891-893.

* cited by examiner

COMPOSITION FOR LIQUID CRYSTAL POLYMER SYNTHESIS, LIQUID CRYSTAL POLYMER FOR ELECTRICAL/ELECTRONIC PRODUCTS, POLYMER RESIN COMPOSITION, AND MOLDED PRODUCT USING THE SAME

CROSS-REFERENCE TO RELATED APPLICATION(S)

This application is a national stage application under 35 U.S.C. 371 and claims the be of PCT Application No. PCT/KR2018/006112 having an international filing date of 29 May 2018, which designated the United States, which PCT application claimed the benefit of priority from Korean Patent Application No. 10-2017-0070919 filed on Jun. 7, 2017 and Korean Patent Application No. 10-2017-0166961 filed on Dec. 6, 2017 with the Korean Intellectual Property Office, the disclosures of each of which are incorporated herein by reference in their entirety.

TECHNICAL FIELD

The present invention relates to a composition for liquid crystal polymer synthesis, a liquid crystal polymer for electrical/electronic products, a polymer resin composition, and a molded product using the same. More specifically, the present invention relates to a composition for liquid crystal polymer synthesis having excellent insulation properties, heat resistance, and processability, a liquid crystal polymer for electrical/electronic products, a polymer resin composition, and a molded product using the same.

BACKGROUND ART

Generally, a liquid crystal polymer is a polymer having a liquid crystal property while maintaining its crystalline state even in a molten state, and has excellent properties in terms of heat resistance, flowability, flame retardancy, and moldability.

There are various kinds of liquid crystal polymers having such properties, but in most cases, only aromatic molecules are used as monomers, and the basic properties of the liquid crystal polymers vary depending on the ratio of the content of the monomers.

Recently, the necessity of high-voltage parts has been highlighted in accordance with product specifications of electrical and electronic parts. For example, in order to apply to parts such as a USB 3.1 connector, it is necessary to have an excellent insulation property as well as excellent heat resistance.

Among commercially available polymeric materials, there are no materials having excellent heat resistance, flowability, moldability, and insulation properties at the same time, and thus a polymeric material having all of these physical properties is required. As an example, in the case of the wholly aromatic liquid crystal polymer resin currently applied in the connector market, a comparative tracking index (CTI) rating is as low as class 3 to class 4, which may cause leakage of current or breakage of parts, etc.

Due to these limitations, there is a need for a plastic product with excellent comparative tracking index properties, which can be applied to high voltage electrical and electronic connector products.

Therefore, there is a demand for development of a liquid crystal polymer having excellent insulation properties and heat resistance at a level usable for high-voltage parts which are difficult to realize physical properties in conventional polymeric materials.

DETAILED DESCRIPTION OF THE INVENTION

Technical Problem

It is one object of the present invention to provide a composition for liquid crystal polymer synthesis that is capable of synthesizing a liquid crystal polymer having excellent insulation properties, heat resistance, and processability.

It is another object of the present invention to provide a liquid crystal polymer for electrical/electronic products having excellent insulation properties, heat resistance, and processability.

It is a further object of the present invention to provide a polymer resin composition and a molded product using the above-described liquid crystal polymer.

Technical Solution

The present invention provides a composition for liquid crystal polymer synthesis including: an alicyclic dicarboxylic acid or its derivative; an aromatic diol; an aromatic monocarboxylic acid having 7 to 10 carbon atoms and containing a hydroxyl group; and an aromatic monocarboxylic acid having 11 to 20 carbon atoms and containing a hydroxyl group, wherein a molar ratio of the alicyclic dicarboxylic acid or its derivative is 0.9 to 1.1 with respect to 1 mol of the aromatic diol, and wherein the total molar content of the alicyclic dicarboxylic acid or its derivative and the aromatic diol is 20 mol % to 80 mol % based on the overall composition.

The present invention also provides a liquid crystal polymer for electrical/electronic products including a repeating unit represented by the following Chemical Formula 5 and a repeating unit represented by the following Chemical Formula 6, wherein the sum of the molar content of the repeating unit represented by Chemical Formula 5 and the molar content of the repeating unit represented by Chemical Formula 6 is 90 mol % to 99 mol %.

[Chemical Formula 5]

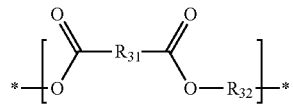

In Chemical Formula 5, $R_{31}$ is a cycloalkylene group having 3 to 10 carbon atoms, and $R_{32}$ is an arylene group having 6 to 20 carbon atoms.

[Chemical Formula 6]

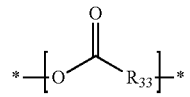

In Chemical Formula 6, $R_{33}$ is an arylene group having 6 to 9 carbon atoms.

In addition, the present invention provides a polymer resin composition and a molded product using the above-described liquid crystal polymer for electrical/electronic products.

Hereinafter, a composition for liquid crystal polymer synthesis according to a specific embodiment of the present invention, a liquid crystal polymer for electrical/electronic products, a polymer resin composition, and a molded product using the same will be described in detail.

Throughout the specification, when one part "includes" one constituent element, unless otherwise specifically described, this does not mean that another constituent element is excluded, but means that another constituent element may be further included.

In the present specification, a derivative means a compound whose modification has been made to the degree that does not drastically change the structure and property of a chemical compound as a precursor, such as introduction of functional groups, oxidation, reduction, replacement of atoms, or the like. Specifically, examples of the derivative of dicarboxylic acid compound such as aliphatic dicarboxylic acid, alicyclic dicarboxylic acid, and aromatic dicarboxylic acid include dicarboxylic acid ester compounds such as aliphatic dicarboxylic acid ester, alicyclic dicarboxylic acid ester, and aromatic dicarboxylic acid ester.

In the present specification, monocarboxylic acid means a compound having one carboxyl group (—COOH) in the molecule, and dicarboxylic acid means a compound having two carboxyl groups (—COOH) in the molecule.

In the present specification, the alkyl group may be linear or branched, and the number of carbon atoms thereof is 1 to 20. According to another embodiment, the alkyl group has 1 to 10 carbon atoms. According to a further embodiment, the alkyl group has 1 to 6 carbon atoms.

In the present specification, the aryl group is not particularly limited, but preferably has 6 to 20 carbon atoms, and may be a monocyclic aryl group or a polycyclic aryl group. According to one embodiment, the aryl group has 6 to 30 carbon atoms. According to another embodiment, the aryl group has 6 to 20 carbon atoms. The aryl group may be a phenyl group, a biphenyl group, a terphenyl group, or the like as the monocyclic aryl group, but is not limited thereto. Examples of the polycyclic aryl group include a naphthyl group, an anthracenyl group, a phenanthryl group, a pyrenyl group, a perylenyl group, a chrycenyl group, a fluorenyl group, or the like, but is not limited thereto.

In the present specification, the cycloalkylene group is a divalent group derived from a cycloalkane, and the number of carbon atoms thereof is 3 to 30, 3 to 20, or 3 to 10. Examples thereof include cyclopropylene, cyclobutylene, cyclopentylene, 3-methylcyclopentylene, 2,3-dimethylcyclopentylene, cyclohexylene, 3-methylcyclohexylene, 4-methylcyclohexylene, 2,3-dimethylcyclohexylene, 3,4,5-trimethylcyclohexylene, 4-tert-butylcyclohexylene, cycloheptylene, cyclooctylene, and the like, but are not limited thereto.

In the present specification, the arylene group means a substituent where two bonding positions exist at the aryl group, that is, a divalent group. Except that the groups are each the divalent group, the aforementioned description of the aryl group may be applied thereto.

According to one embodiment of the present invention, a composition for liquid crystal polymer synthesis may be provided, including: an alicyclic dicarboxylic acid or its derivative; an aromatic diol; an aromatic monocarboxylic acid containing a hydroxyl group and having 7 to 10 carbon atoms; and an aromatic monocarboxylic acid containing a hydroxyl group and having 11 to 20 carbon atoms, wherein the molar ratio of the alicyclic dicarboxylic acid or its derivative is 0.9 to 1.1 with respect to the aromatic diol, and wherein the total molar content of the alicyclic dicarboxylic acid or its derivative and the aromatic diol is 20 mol % to 80 mol % based on the overall composition.

Specifically, in the composition for liquid crystal polymer synthesis of one embodiment of the invention, the molar ratio of the alicyclic dicarboxylic acid or its derivative is 0.9 to 1.1, preferably 1, with respect to 1 mol of the aromatic diol and the total molar content of the alicyclic dicarboxylic acid or its derivative, and the aromatic diol is present at 20 mol % to 80 mol %, 20 mol % to 36 mol %, or 66 mol % to 80 mol %, based on the overall composition.

The present inventors found through experiments that, in the composition for liquid crystal polymer synthesis, by adjusting the total molar content of the alicyclic dicarboxylic acid or its derivative and the aromatic diol to be 20 mol % to 80 mol % based on the overall composition, while adjusting the molar ratio of the alicyclic dicarboxylic acid or its derivative to be 0.9 to 1.1, preferably 1 with respect to 1 mol of the aromatic diol, a liquid crystal polymer prepared by subjecting the monomers to acetylation reaction at an initial reaction temperature of 100° C. to 200° C. and at normal pressure, and then raising the temperature to 300° C. to 400° C., and after reaching to the final temperature, stepwise reducing from normal pressure to a pressure below 1 torr, it mainly contains a repeating unit between an alicyclic dicarboxylic acid or its derivative and an aromatic diol, so that both heat resistance and insulation properties can be ensured, thereby completing the present invention.

Specifically, the composition for liquid crystal polymer synthesis of one embodiment of the invention may further include, in addition to the alicyclic dicarboxylic acid or its derivative and the aromatic diol, an aromatic monocarboxylic acid having 7 to 10 carbon atoms and containing a hydroxyl group and an aromatic monocarboxylic acid having 11 to 20 carbon atoms and containing a hydroxyl group in order to control the heat resistance of the liquid crystal polymer to be produced.

In this case, the aromatic monocarboxylic acid having 7 to 10 carbon atoms and containing a hydroxyl group is added so that the total molar content of the alicyclic dicarboxylic acid or its derivative, the aromatic diol, and the aromatic monocarboxylic acid having 7 to 10 carbon atoms and containing a hydroxyl group is 90 mol % or higher, or 90 mol % to 99 mol % based on the entire composition, the monomers are subjected to acetylation reaction at an initial reaction temperature of 100° C. to 200° C. and at normal pressure, the temperature is finally raised to 300° C. to 400° C., and then the pressure is reduced stepwise from normal pressure to a pressure below 1 torr, whereby an esterification reaction of an alicyclic dicarboxylic acid or its derivative and an aromatic diol, and an aromatic monocarboxylic acid having 7 to 10 carbon atoms and containing a hydroxyl group is carried out, so that an alicyclic-aromatic mesogen in the final liquid crystal polymer can be induced to form the main repeating unit.

Further, the aromatic monocarboxylic acid having 11 to 20 carbon atoms and containing a hydroxyl group has a relatively strong aromatic property per unit compound, so that even when contained in a small amount, the insulating property of the entire polymer can be greatly reduced. Therefore, by applying the amount of the aromatic monocarboxylic acid to be equal to or less than a certain amount, it is possible to sufficiently realize the insulating property due to the mesogen formed by the alicyclic dicarboxylic acid or its derivative and the aromatic diol.

More specifically, looking at the content of each component contained in the composition for liquid crystal polymer synthesis according to one embodiment, the alicyclic dicarboxylic acid or its derivative may be included in an amount of 10 mol % to 40 mol % and the aromatic diol in an amount of 10 mol % to 40 mol % based on 100 mol % of the entire composition for liquid crystal polymer synthesis, and the molar content of the aromatic monocarboxylic acid having 7 to 10 carbon atoms and containing a hydroxyl group may include 15 mol % to 75 mol %, and the molar content of the aromatic monocarboxylic acid having 11 to 20 carbon atoms and containing a hydroxyl group may include 1 mol % to 6 mol %, based on the overall composition.

In particular, when the alicyclic dicarboxylic acid or its derivative is added in an amount of 10 mol % to 18 mol % or 33 mol % to 40 mol % and the aromatic diol in an amount of 10 mol % to 18 mol % or 33 mol % to 40 mol %, so that the total content of the alicyclic dicarboxylic acid or its derivative and the aromatic diol is added to be 20 mol % to 36 mol %, or 66 mol % to 80 mol %, excellent heat resistance and insulation properties can be secured. When out of the above-mentioned molar content range, the insulation property or the heat resistance may be decreased, or it may be difficult to sufficiently realize liquid crystal properties.

The alicyclic dicarboxylic acid or its derivative is a compound for introducing an alicyclic moiety into the liquid crystal polymer, whereby the insulating property of the liquid crystal polymer can be improved. The alicyclic dicarboxylic acid or its derivative may include a cycloalkane dicarboxylic acid having 5 to 20 carbon atoms or an ester compound thereof.

Specific examples of the cycloalkane dicarboxylic acid having 5 to 20 carbon atoms or an ester compound thereof include 1,4-cyclohexanedicarboxylic acid, 1,3-cyclohexanedicarboxylic acid, 1,2-cyclohexanedicarboxylic acid, 1,4-dimethylcyclohexane dicarboxylate, 1,3-dimethylcyclohexane dicarboxylate, 1,2-dimethylcyclohexane dicarboxylate, and the like. Preferably, 1,4-cyclohexanedicarboxylic acid can be used.

On the other hand, the aromatic diol is used as a reactive monomer for carrying out the esterification reaction with the alicyclic dicarboxylic acid or its derivative, and can improve the heat resistance and mechanical properties of the liquid crystal polymer. As an example of the aromatic diol, a benzenediol having 6 to 10 carbon atoms can be used. When the number of carbon atoms of the benzenediol is increased to 10 or more, the insulation property may be decreased due to an increase in the aromatic moiety introduced into the liquid crystal polymer.

Examples of the benzenediol having 6 to 10 carbon atoms include hydroquinone, resorcinol, and the like, and preferably, hydroquinone may be used.

On the other hand, the aromatic monocarboxylic acid having 7 to 10 carbon atoms and containing a hydroxyl group can be added for controlling the heat resistance of the liquid crystal polymer to be produced, and specifically, an aromatic monocarboxylic acid having 7 to 10 carbon atoms and containing a hydroxyl group can be represented by the following Chemical Formula 1.

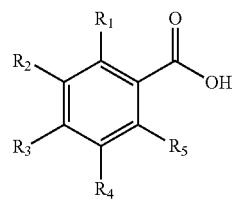

[Chemical Formula 1]

In Chemical Formula 1, at least one of $R_1$ to $R_5$ is a hydroxyl group, and the rest are each independently hydrogen, an alkyl group having 1 to 10 carbon atoms, or an aryl group having 6 to 20 carbon atoms.

Preferably, 4-hydroxybenzoic acid in which $R_3$ in Chemical Formula 1 is a hydroxyl group and $R_1$, $R_2$, $R_4$, and $R_5$ are hydrogen may be used.

The aromatic monocarboxylic acid having 11 to 20 carbon atoms and containing a hydroxyl group is an aromatic monocarboxylic acid having 11 to 20 carbon atoms and containing a hydroxyl group and may be represented by the following Chemical Formula 2.

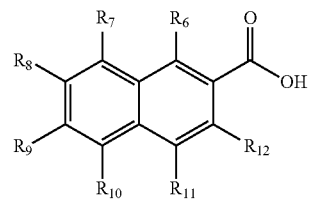

[Chemical Formula 2]

In Chemical Formula 2, at least one of $R_6$ to $R_{12}$ is a hydroxyl group, and the rest are each independently hydrogen, an alkyl group having 1 to 10 carbon atoms, or an aryl group having 6 to 20 carbon atoms.

Preferably, 6-hydroxy-2-naphthalenecarboxylic acid in which $R_9$ in Chemical Formula 2 is a hydroxyl group, and $R_6$ to $R_8$, and $R_{10}$ to $R_{12}$ are hydrogen, may be used.

On the other hand, the composition for liquid crystal polymer synthesis may further include a cycloalkane monocarboxylic acid having 5 to 20 carbon atoms and containing a hydroxyl group, a bicycloalkane monocarboxylic acid having 5 to 30 carbon atoms and containing a hydroxyl group, or an ester compound thereof.

A specific example of the cycloalkane monocarboxylic acid having 5 to 20 carbon atoms and containing a hydroxyl group may include a compound represented by the following Chemical Formula 3.

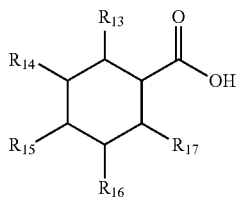

[Chemical Formula 3]

In Chemical Formula 3, at least one of $R_{13}$ to $R_{17}$ is a hydroxyl group, and the rest are each independently hydrogen or an alkyl group having 1 to 10 carbon atoms. Preferably, 4-hydroxycyclohexanecarboxylic acid in which $R_{15}$ in Chemical Formula 3 is a hydroxyl group, and $R_{13}$ to $R_{14}$ and $R_{16}$ to $R_{17}$ are hydrogen, may be used.

A specific example of the bicycloalkane monocarboxylic acid having 5 to 30 carbon atoms and containing a hydroxyl group may include a compound represented by the following Chemical Formula 4.

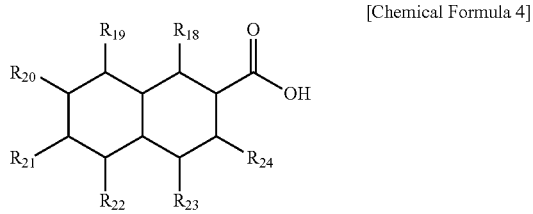

[Chemical Formula 4]

In Chemical Formula 4, at least one of $R_{18}$ to $R_{24}$ is a hydroxyl group, and the rest are each independently hydrogen, an alkyl group having 1 to 10 carbon atoms, or an aryl group having 6 to 20 carbon atoms. Preferably, decahydro-6-hydroxy-2-naphthalenecarboxylic acid in which $R_{21}$ in Chemical Formula 4 is a hydroxyl group, and $R_{18}$ to $R_{20}$ and $R_{22}$ to $R_{24}$ are hydrogen, may be used.

In addition, the composition for liquid crystal polymer synthesis may further include an alicyclic diol having 5 to 20 carbon atoms, a derivative compound of an aromatic diol, or an aromatic dicarboxylic acid, if necessary.

Examples of the alicyclic diol having 5 to 20 carbon atoms include 1,4-cyclohexanediol, 1,3-cyclohexanediol, 1,2-cyclohexanediol, 4,4'-bicyclohexanol, 3,3'-bicyclohexanol, 2,2'-bicyclohexanol, and the like.

Examples of the derivative compound of the aromatic diol include acetaminophen. Examples of the aromatic dicarboxylic acid include terephthalic acid, isophthalic acid, and the like.

The composition for liquid crystal polymer synthesis may include various additives for improving physical properties and the like. The type of the additive, the method of addition, and the time of addition are not particularly limited, and various known methods can be applied without limitation. Specific examples of the additive include an impact-reinforcing agent, an antioxidant, a compatibilizer, a hydrolysis stabilizer, an ultraviolet light stabilizer, a heat stabilizer, a coloring additive, a fixing agent, a flame retardant, an electrically conductive material for loss of static electricity, or a mixture of two or more thereof.

In the composition for liquid crystal polymer synthesis, the liquid crystal polymer can be used as parts of electrical/electronic products, more preferably as parts of electrical/electronic products for high voltage, or as parts of electronic apparatus for mass transmission. Since the liquid crystal polymer prepared by the composition for liquid crystal polymer synthesis not only satisfies the comparative tracking index rating required for component materials for high voltage but also retains excellent heat resistance and has excellent flowability of the liquid crystal polymer alone, it is possible to provide a material satisfying all physical properties required for the component materials for high voltage.

On the other hand, according to another embodiment of the invention, there a liquid crystal polymer including a polymerization product of the composition for liquid crystal polymer synthesis of the one embodiment may be provided. Specifically, a liquid crystal polymer for electrical/electronic products may be provided, including a repeating unit represented by Chemical Formula 5 and a repeating unit represented by Chemical Formula 6, wherein the sum of the molar content of the repeating unit represented by Chemical Formula 5 and the molar content of the repeating unit represented by Chemical Formula 6 is 90 mol % to 99 mol %.

The present inventors found through experiments that, as a repeating unit represented by Chemical Formula 5 (a repeating unit formed by an esterification reaction between an alicyclic dicarboxylic acid or its derivative and an aromatic diol) and a repeating units represented by Chemical Formula 6 (a repeating unit formed by esterification reaction of an aromatic monocarboxylic acid having 7 to 10 carbon atoms and containing a hydroxyl group) are mainly contained in the liquid crystal polymer for electrical/electronic products, the insulation property can be secured together with the heat resistance, thereby completing the present invention.

In the liquid crystal polymer for electrical/electronic products, the repeating unit represented by Chemical Formula 5 and the repeating unit represented by Chemical Formula 6 may form a block copolymer that is bonded while forming respective blocks, or may form a random copolymer that is randomly bonded. The specific form of polymerization thereof are not particularly limited.

Specifically, in the liquid crystal polymer for electrical/electronic products, the sum of the molar amount of the repeating unit represented by Chemical Formula 5 and the molar amount of the repeating unit represented by Chemical Formula 6 may be 90 mol % to 99 mol %, 93 mol % to 99 mol %, or 96 mol % to 99 mol %, based on the molar content of all the repeating units contained in the entire liquid crystal polymer.

The sum of the molar content of the repeating unit represented by Chemical Formula 5 and the molar content of the repeating unit represented by Chemical Formula 6 refers to a value obtained by adding the respective values of the molar content of the repeating unit represented by Chemical Formula 5 and the molar content of the repeating unit represented by Chemical Formula 6, when the molar content of all the repeating units contained in the entire liquid crystal polymer is 100 mol %.

That is, in the liquid crystal polymer for electrical/electronic products, the repeating unit represented by Chemical Formula 5 and the repeating unit represented by Chemical Formula 6 occupy most of the main repeating unit, and the physical properties of the liquid crystal polymer can be realized by the repeating unit represented by Chemical Formula 5 and the repeating unit represented by Chemical Formula 6.

In Chemical Formula 5, $R_{31}$ is a cycloalkylene group having 3 to 10 carbon atoms and $R_{32}$ is an arylene group having 6 to 20 carbon atoms, or $R_{31}$ is a cycloalkylene group having 4 to 8 carbon atoms and $R_{32}$ is an arylene group having 6 to 10 carbon atoms.

In Chemical Formula 6, $R_{33}$ may be an arylene group having 6 to 9 carbon atoms, or a phenylene group.

The Chemical Formula 5 may include a repeating unit represented by the following Chemical Formula 5-1.

[Chemical Formula 5-1]

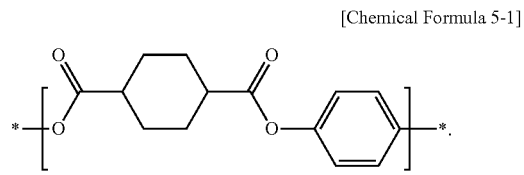

The Chemical Formula 6 may include a repeating unit represented by the following Chemical Formula 6-1.

[Chemical Formula 6-1]

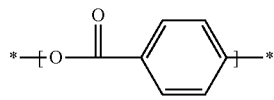

The liquid crystal polymer for electrical/electronic products may further include one or more repeating units selected from the group consisting of the following Chemical Formula 7, Chemical Formula 8, Chemical Formula 9, Chemical Formula 10, Chemical Formula 11, and Chemical Formula 12. The one or more repeating units selected from the group consisting of Chemical Formula 7, Chemical Formula 8, Chemical Formula 9, Chemical Formula 10, Chemical Formula 11, and Chemical Formula 12 may mean one kind of each of Chemical Formula 7, Chemical Formula 8, Chemical Formula 9, Chemical Formula 10, Chemical Formula 11, and Chemical Formula 12, or a mixture of two or more thereof.

[Chemical Formula 7]

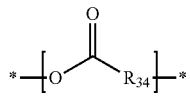

In Chemical Formula 7, $R_{34}$ may be an arylene group having 10 to 20 carbon atoms, or a naphthylene group having 10 carbon atoms.

[Chemical Formula 8]

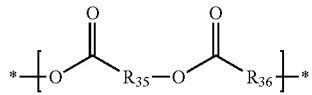

In Chemical Formula 8, $R_{35}$ is an arylene group having 10 to 20 carbon atoms or a naphthylene group having 10 carbon atoms, and $R_{36}$ is an arylene group having 6 to 9 carbon atoms or a phenylene group having 6 carbon atoms.

[Chemical Formula 9]

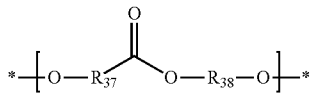

In Chemical Formula 9, $R_{37}$ is an arylene group having 10 to 20 carbon atoms or a naphthylene group having 10 carbon atoms, and $R_{38}$ is an arylene group having 6 to 9 carbon atoms or a phenylene group having 6 carbon atoms.

[Chemical Formula 10]

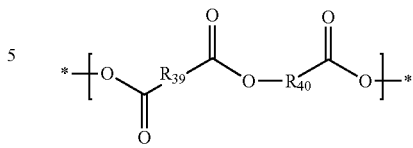

In Chemical Formula 10, $R_{39}$ is a cycloalkylene group having 3 to 10 carbon atoms or a cyclohexylene group having 6 carbon atoms, and $R_{40}$ is an arylene group having 10 to 20 carbon atoms or a naphthylene group having 10 carbon atoms.

[Chemical Formula 11]

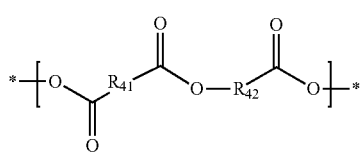

In Chemical Formula 11, $R_{41}$ is a cycloalkylene group having 3 to 10 carbon atoms or a cyclohexylene group having 6 carbon atoms, and $R_{42}$ is an arylene group having 6 to 9 carbon atoms or a phenylene group having 6 carbon atoms.

[Chemical Formula 12]

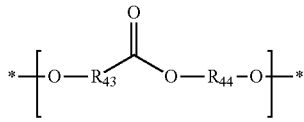

In Chemical Formula 12, $R_{43}$ is an arylene group having 6 to 9 carbon atoms or a phenylene group having 6 carbon atoms, and $R_{44}$ is an arylene group having 6 to 9 carbon atoms or a phenylene group having 6 carbon atoms.

More specifically, the Chemical Formula 7, Chemical Formula 8, Chemical Formula 9, Chemical Formula 10, Chemical Formula 11, and Chemical Formula 12 may include the following Chemical Formula 7-1, Chemical Formula 8-1, Chemical Formula 9-1, Chemical Formula 10-1, Chemical Formula 11-1, and Chemical Formula 12-1, respectively.

[Chemical Formula 7-1]

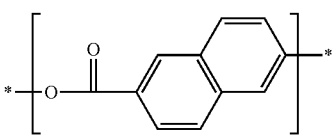

[Chemical Formula 8-1]

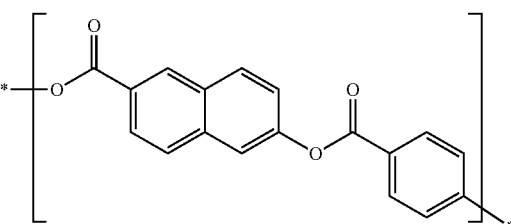

-continued

[Chemical Formula 9-1]

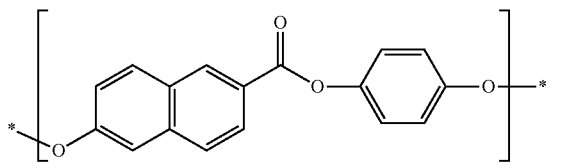

[Chemical Formula 10-1]

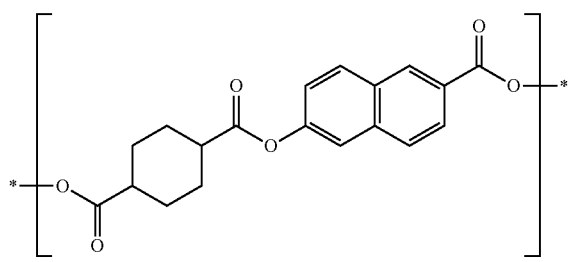

[Chemical Formula 11-1]

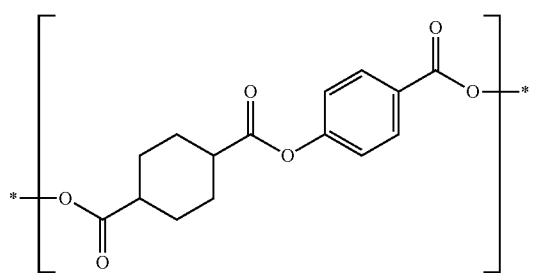

[Chemical Formula 12-1]

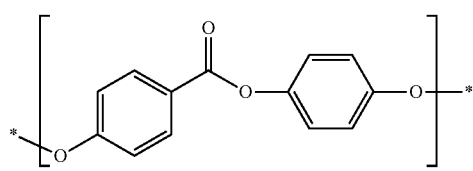

The content of one or more repeating units selected from the group consisting of Chemical Formula 7, Chemical Formula 8, Chemical Formula 9, Chemical Formula 10, Chemical Formula 11, and Chemical Formula 12 may be 1 mol % to 10 mol %, 1 mol % to 7 mol %, or 1 mol % to 4 mol %. That is, as a repeating unit represented by Chemical Formula 5 (a repeating unit formed by an esterification reaction between an alicyclic dicarboxylic acid or its derivative and an aromatic diol) and a repeating unit represented by Chemical Formula 6 (a repeating unit formed by esterification reaction of an aromatic monocarboxylic acid having 7 to 10 carbon atoms and containing a hydroxyl group) are mainly contained in the liquid crystal polymer, the insulation property can be secured together with the heat resistance.

The liquid crystal polymer for electrical/electronic products can be used as parts of electrical/electronic products, more preferably as parts of electrical/electronic products for high voltage, or as parts of electronic apparatus for mass transmission. Since the liquid crystal polymer for electrical/electronic products not only satisfies the comparative tracking index rating required for component materials for high voltage but also retains excellent heat resistance and has excellent flowability of the liquid crystal polymer alone, it is possible to provide a material satisfying all the physical properties required for the component materials for high voltage.

Examples of the method for preparing the liquid crystal polymer for electrical/electronic products of the one embodiment are not particularly limited, but for example, the method may include: a step of reacting a composition for liquid crystal polymer synthesis including an alicyclic dicarboxylic acid or its derivative, an aromatic diol, an aromatic monocarboxylic acid having 7 to 10 carbon atoms and containing a hydroxyl group, and an aromatic monocarboxylic acid having 11 to 20 carbon atoms and containing a hydroxyl group, wherein the molar ratio of the alicyclic dicarboxylic acid or its derivative is 0.9 to 1.1 with respect to 1 mol of the aromatic diol, and wherein the total molar content of the alicyclic dicarboxylic acid or its derivative, and the aromatic diol, is 20 mol % to 80 mol % based on the entire composition, at a temperature of 300° C. to 400° C. and at normal pressure; and a step of reducing the pressure of the resultant reaction product to 1 torr or lower to perform a reaction. The liquid crystal polymer of another embodiment can be prepared by the above-described production method. In addition, the details of the composition for liquid crystal polymer synthesis include those described above with reference to the one embodiment.

Specifically, in the composition for liquid crystal polymer synthesis, the molar ratio of the alicyclic dicarboxylic acid or its derivative is 0.9 to 1.1, preferably 1, with respect to 1 mol of the aromatic diol, and the total molar content of the alicyclic dicarboxylic acid or its derivative, and the aromatic diol amount is 20 mol % to 80 mol %, 20 mol % to 36 mol %, or 66 mol % to 80 mol %, based on the overall composition.

By adjusting the total molar content of the alicyclic dicarboxylic acid or its derivative and the aromatic diol to be 20 mol % to 80 mol % based on the entire composition, while adjusting the molar ratio of the alicyclic dicarboxylic acid or its derivative to be 0.9 to 1.1, preferably 1, a liquid crystal polymer produced by subjecting the monomers to acetylation reaction at an initial reaction temperature of 100° C. to 200° C. and at normal pressure, followed by raising the temperature to 300° C. to 400° C., and after reaching to the final temperature, stepwise reducing from normal pressure to a pressure below 1 torr mainly contains a repeating unit between an alicyclic dicarboxylic acid or its derivative and an aromatic diol, and thereby insulation properties can be ensured together with heat resistance.

In particular, the composition for liquid crystal polymer synthesis may further include, in addition to the alicyclic dicarboxylic acid or its derivative and the aromatic diol, an aromatic monocarboxylic acid having 7 to 10 carbon atoms and containing a hydroxyl group and an aromatic monocarboxylic acid having 11 to 20 carbon atoms and containing a hydroxyl group in order to control the heat resistance of the liquid crystal polymer to be prepared.

In this case, the aromatic monocarboxylic acid having 7 to 10 carbon atoms and containing a hydroxyl group is added so that the total molar content of the alicyclic dicarboxylic acid or its derivative, the aromatic diol, and the aromatic monocarboxylic acid having 7 to 10 carbon atoms and containing a hydroxyl group is 90 mol % or higher, or 90 mol % to 99 mol %, based on the entire composition, the monomers are subjected to acetylation reaction at an initial reaction temperature of 100° C. to 200° C. and at normal pressure, the temperature is finally raised to 300° C. to 400° C., then the pressure is reduced stepwise from normal pressure to a pressure below 1 torr to proceed an esterification reaction of an alicyclic dicarboxylic acid or its derivative with an aromatic diol and an aromatic monocarboxylic acid having 7 to 10 carbon atoms and containing a hydroxyl group, whereby an alicyclic-aromatic mesogen in the final liquid crystal polymer can be induced to form the main repeating unit.

The aromatic monocarboxylic acid having 11 to 20 carbon atoms and containing a hydroxyl group has a relatively strong aromatic property per unit compound, so that even when contained in a small amount, the insulating property of the entire polymer can be greatly improved. Therefore, by applying the amount of the aromatic monocarboxylic acid to be equal to or less than a certain amount, it is possible to sufficiently realize the insulating property due to the mesogen formed by the alicyclic dicarboxylic acid or its derivative and the aromatic diol.

More specifically, the alicyclic dicarboxylic acid or its derivative may be included in an amount of 10 mol % to 40 mol % and the aromatic diol in an amount of 10 mol % to 40 mol % based on 100 mol % of the entire composition for liquid crystal polymer synthesis, the molar content of the aromatic monocarboxylic acid having 7 to 10 carbon atoms and containing a hydroxyl group may be 15 mol % to 75 mol %, and the molar content of the aromatic monocarboxylic acid having 11 to 20 carbon atoms and containing a hydroxyl group may be 1 mol % to 6 mol %, based on the entire composition.

In particular, when the alicyclic dicarboxylic acid or its derivative is added in an amount of 10 mol % to 18 mol % or 33 mol % to 40 mol %, and the aromatic diol in an amount of 10 mol % to 18 mol % or 33 mol % to 40 mol %, so that the total content of the alicyclic dicarboxylic acid or its derivative and the aromatic diol is added in an amount of 20 mol % to 36 mol % or 66 mol % to 80 mol %, excellent heat resistance and insulation properties can be secured. When out of the above-mentioned molar content range, the insulation property or the heat resistance may be decreased, or it may be difficult to sufficiently realize liquid crystal properties.

The alicyclic dicarboxylic acid or its derivative is a compound for introducing an alicyclic moiety into the liquid crystal polymer, whereby the insulating property of the liquid crystal polymer can be improved. The alicyclic dicarboxylic acid or its derivative may include a cycloalkane dicarboxylic acid having 5 to 20 carbon atoms or an ester compound thereof.

Specific examples of the cycloalkane dicarboxylic acid having 5 to 20 carbon atoms or an ester compound thereof include 1,4-cyclohexanedicarboxylic acid, 1,3-cyclohexanedicarboxylic acid, 1,2-cyclohexanedicarboxylic acid, 1,4-dimethylcyclohexane dicarboxylate, 1,3-dimethylcyclohexane dicarboxylate, 1,2-dimethylcyclohexane dicarboxylate, and the like. Preferably, 1,4-cyclohexanedicarboxylic acid can be used.

On the other hand, the aromatic diol is used as a reaction monomer for carrying out the esterification reaction with the alicyclic dicarboxylic acid or its derivative, and can improve the heat resistance and mechanical properties of the liquid crystal polymer. As an example of the aromatic diol, a benzenediol having 6 to 10 carbon atoms can be used. When the number of carbon atoms of the benzenediol is increased to 10 or higher, the insulation property may be decreased due to an increase in the aromatic moiety introduced into the liquid crystal polymer.

Examples of the benzenediol having 6 to 10 carbon atoms include hydroquinone, resorcinol, and the like, and preferably, hydroquinone can be used.

On the other hand, the aromatic monocarboxylic acid having 7 to 10 carbon atoms and containing a hydroxyl group can be added for controlling the heat resistance of the liquid crystal polymer to be prepared. Specifically, as the aromatic monocarboxylic acid having 7 to 10 carbon atoms and containing a hydroxyl group, 4-hydroxybenzoic acid can be used.

The aromatic monocarboxylic acid having 11 to 20 carbon atoms and containing a hydroxyl group is an aromatic monocarboxylic acid having 11 to 20 carbon atoms and containing a hydroxyl group, and specifically, 6-hydroxy-2-naphthalenecarboxylic acid, can be used.

On the other hand, the composition for liquid crystal polymer synthesis may further include a cycloalkane monocarboxylic acid having 5 to 20 carbon atoms and containing a hydroxy group, a bicycloalkane monocarboxylic acid having 5 to 30 carbon atoms and containing a hydroxyl group, or an ester compound thereof.

A specific example of the cycloalkane monocarboxylic acid having 5 to 20 carbon atoms and containing a hydroxyl group may include 4-hydroxycyclohexanecarboxylic acid.

A specific example of the bicycloalkane monocarboxylic acid having 5 to 30 carbon atoms and containing a hydroxyl group may include decahydro-6-hydroxy-2-naphthalenecarboxylic acid.

In addition, the composition for liquid crystal polymer synthesis may further include an alicyclic diol having 5 to 20 carbon atoms, a derivative compound of an aromatic diol, or an aromatic dicarboxylic acid, if necessary.

Examples of the alicyclic diol having 5 to 20 carbon atoms include 1,4-cyclohexanediol, 1,3-cyclohexanediol, 1,2-cyclohexanediol, 4,4'-bicyclohexanol, 3,3'-bicyclohexanol, 2,2'-bicyclohexanol, and the like.

Examples of the derivative compound of the aromatic diol include acetaminophen or the like. Examples of the aromatic dicarboxylic acid include terephthalic acid, isophthalic acid, or the like.

The composition for liquid crystal polymer synthesis may include various additives for improving physical properties and the like. The type of the additive, the method of addition, and the time of addition are not particularly limited, and various known methods can be applied without limitation. Specific examples of the additive include an impact-reinforcing agent, an antioxidant, a compatibilizer, a hydrolysis stabilizer, an ultraviolet light stabilizer, a heat stabilizer, a coloring additive, a fixing agent, a flame retardant, an electrically conductive material for loss of static electricity, or a mixture of two or more thereof.

Through the step of reacting the composition for liquid crystal polymer synthesis at a temperature of 300° C. to 400° C. and at normal pressure, the oligomer formed by the reaction between the monomers is subjected to polycondensation to form a polymer.

Further, as the step of reducing the pressure of the resultant reaction product to 1 torr or lower to perform a reaction proceeds, it is possible to prepare a liquid crystal polymer having an excellent comparative tracking index rating.

Prior to the step of reacting the composition for liquid crystal polymer synthesis at a temperature of 300° C. to 400° C. and at normal pressure, the method may further include a step of adding an acid anhydride to the composition for liquid crystal polymer synthesis and reacting them at a temperature of 100° C. to 200° C. and at normal pressure. Thereby, the acetylation reaction of the functional group of the monomers contained in the composition for liquid crystal polymer synthesis can be induced.

After the step of adding an acid anhydride to the composition for liquid crystal polymer synthesis and reacting them at a temperature of 100° C. to 200° C. and at normal pressure, the method may further include a step of raising the temperature at a rate of 0.5° C./min to 1.5° C./min. Thereby, oligomers can be formed by the reaction between the monomers.

That is, a specific method for preparing the liquid crystal polymer includes: an acetylation step of adding an acid anhydride to a composition for liquid crystal polymer synthesis and reacting them at a temperature of 100° C. to 200° C. and at normal pressure; a step of raising the temperature of the contents to 300° C. to 400° C. at a rate of 0.5° C./min to 1.5° C./min to prepare an oligomer; and after reaching to the final temperature, a step of stepwise reducing from normal pressure to a pressure below 1 torr for 30 minutes to 1 hour to polycondense a polymer.

On the other hand, the method for preparing a liquid crystal polymer may further include a step of removing by-products generated as needed after each step.

The liquid crystal polymer for electrical/electronic products may have a melt viscosity value of 10 poise to 2000 poise, 15 poise to 1500 poise, or 20 poise to 1000 poise as measured at a shear rate of 1000 $s^{-1}$ at a temperature of 20° C. higher than melting temperature using a capillary viscometer.

Further, the melting temperature (Tm) of the liquid crystal polymer for electrical/electronic products measured by differential scanning calorimetry may be 275° C. to 350° C., 280° C. to 340° C., or 285° C. to 330° C., and the heat of fusion may be 0.4 J/g to 5 J/g, 0.7 J/g to 4.0 J/g, or 1.0 J/g to 3.0 J/g. A liquid crystal polymer having the melting temperature and heat of fusion described above can have excellent flowability and heat resistance.

Specifically, the liquid crystal polymer for electrical/electronic products may have a flow temperature (Tf) of 250° C. to 320° C., 255° C. to 310° C., or 260° C. to 300° C. as measured by a flow tester, and a crystallization temperature (Tc) of 265° C. to 350° C., 270° C. to 340° C., or 275° C. to 330° C. as measured by a differential scanning calorimetry.

Further, the liquid crystal polymer for electrical/electronic products has characteristics that the comparative tracking index rating is divided into class 0 to class 1 when a test specimen manufactured by a hot press to a size of 35 mm*35 mm*1 T at a temperature of 20° C. higher than the melting temperature of the polymer is evaluated under various voltages.

As the comparative tracking index rating is closer to class 2 or class 3, the tracking is generated by pollutants due to the high voltage of 450 V or higher and thus the insulating property deteriorates. In the case of class 0 or class 1, it can exhibit excellent insulation properties even at a high voltage of 450 V or higher.

According to another embodiment of the present invention, a polymer resin composition including the liquid crystal polymer for electrical/electronic products or a molded product thereof may be provided.

The details of the liquid crystal polymer for electrical/electronic products include all those described above with reference to the other embodiments.

Further, the polymer resin composition may be composed of a liquid crystal polymer for electrical/electronic products alone, or may further include other polymers or additives.

As the above-mentioned other polymers, conventionally known thermoplastic resins, thermosetting resins, and their single, blend, or co-polymer types may be variously applied without limitation. Specific examples thereof include at least one resin selected from the group consisting of an epoxy resin, a phenol-based resin, nylon, a polyester-based resin, and a polyphenylene sulfide (PPS)-based resin.

Further, examples of the additive include a fiber-reinforcing material, an inorganic filler, an impact-reinforcing agent, a nucleating agent, an antioxidant, a lubricant, a release agent, a colorant, a compatibilizer, a heat stabilizer, an ultraviolet stabilizer, a hydrolysis stabilizer, a viscosity enhancer, a fluorescent whitening agent, a physical property reinforcing agent, a main chain extender, a pigment, a dye, an antistatic agent, or a mixture of two or more thereof. The specific kind of the additive is not particularly limited, and various additives that are widely used in the field of conventional resin compositions can be applied without limitation.

According to another embodiment of the present invention, a molded product including the polymer resin composition of the other embodiments may be provided.

The molded product can be produced by molding the above-mentioned polymer resin composition through various molding processes depending on its application purpose, for example, injection molding, extrusion molding, extrusion blow molding, injection blow molding, and profile extrusion molding, and post-processing such as a thermoforming process using the same. As described above, the molded product may include an electronic product, specifically, parts of electrical/electronic products, for example, parts of electric/electronic apparatuses or parts of electronic apparatuses for mass transmission.

In particular, a micro high-speed injection molding machine can be used for injecting parts of electrical/electronic apparatus requiring micromolding. Since the liquid crystal polymer prepared by the present invention has excellent flowability, it is possible to prepare a micromolded product through high-speed injection molding. In particular, since the liquid crystal polymer prepared according to the present invention has an excellent insulating property, it is possible to prepare and apply molded products of electronic parts requiring physical properties that can withstand a high voltage like parts of a USB 3.1 connector for mass data transfer.

The specific shape and size of the molded product may vary depending on its application purpose, and examples thereof are not particularly limited, but it may have, for example, a shape such as a sheet, a container, or a pellet.

The details of the polymer resin composition includes those described above with reference to the other embodiments.

Advantageous Effects

According to the present invention, a composition for liquid crystal polymer synthesis that is capable of synthesizing a liquid crystal polymer having excellent insulation properties, heat resistance, and processability, a liquid crystal polymer for electrical/electronic products, a polymer resin composition, and a molded product using the same can be provided.

DETAILED DESCRIPTION OF THE EMBODIMENTS

Hereinafter, the present invention will be described in more detail in the following examples. However, these examples are provided only for the purpose of illustration, and are not intended to limit the scope of the present invention thereto in any way.

Examples 1 to 5

Example 1: Preparation of Liquid Crystal Polymer Containing Alicyclic Mesogen A mixture consisting of 65.42 g of 1,4-cyclohexanedicarboxylic acid, 41.80 g of hydroquinone, 7.55 g of 6-hydroxy-2-naphthalenecarboxylic acid, 27.63 g of 4-hydroxybenzoic acid, and 106.11 g of acetic anhydride was heated in a 500 ml glass reactor at 150° C. and reacted for 2 hours. At this time, acetic acid generated as a byproduct was refluxed. Thereafter, while raising the temperature to 350° C. at a rate of 1° C./min, the reaction byproduct was collected in a receiver by cooling acetic acid. After reaching to 350° C., the pressure was gradually reduced from normal pressure to or below 1 torr for 30 minutes. An additional reaction was proceeded at less than 1 torr for 10 minutes to prepare a liquid crystal polymer.

It was confirmed that the liquid crystal polymer prepared in Example 1 had a melting temperature of 329° C. as measured by a differential scanning calorimeter, a flow temperature of 297° C. as measured by a flow tester, and a melt viscosity of 37 poise (shear rate of 1000 $s^{-1}$) as measured with a capillary viscometer.

At this time, with respect to the liquid crystal polymer prepared in Example 1, the total molar content of the 1,4-cyclohexanedicarboxylic acid-hydroquinone polymerization repeating unit and the 4-hydroxybenzoic acid-4-hydroxybenzoic acid polymerization repeating unit corresponds to 90 mol % or higher.

Example 2: Preparation of Liquid Crystal Polymer Containing Alicyclic Mesogen The polymerization reaction was carried out under the same conditions as in Example 1, except that the amount of 1,4-cyclohexanedicarboxylic acid was changed to 56.81 g, the amount of hydroquinone to 36.30 g, and the amount of 4-hydroxybenzoic acid to 41.45 g.

It was confirmed that the liquid crystal polymer prepared in Example 2 had a melting temperature of 323° C. as measured by a differential scanning calorimeter, a crystallization temperature of 310° C., a flow temperature of 287° C. as measured by a flow tester, and a melt viscosity of 99 poise (shear rate of 1000 $s^{-1}$) as measured with a capillary viscometer.

At this time, with respect to the liquid crystal polymer prepared in Example 2, the total molar content of the 1,4-cyclohexanedicarboxylic acid-hydroquinone polymerization repeating unit and the 4-hydroxybenzoic acid-4-hydroxybenzoic acid polymerization repeating unit corresponds to 90 mol % or higher.

Example 3: Preparation of Liquid Crystal Polymer Containing Alicyclic Mesogen The polymerization reaction was carried out under the same conditions as in Example 1, except that the amount of 1,4-cyclohexanedicarboxylic acid was changed to 48.21 g, the amount of hydroquinone to 30.80 g, and the amount of 4-hydroxybenzoic acid to 55.27 g.

It was confirmed that the liquid crystal polymer prepared in Example 3 had a melting temperature of 295° C. as measured by a differential scanning calorimeter, a crystallization temperature of 281° C., a flow temperature of 264° C. as measured by a flow tester, and a melt viscosity of 189 poise (shear rate of 1000 $s^{-1}$) as measured with a capillary viscometer.

At this time, with respect to the liquid crystal polymer prepared in Example 3, the total molar content of the 1,4-cyclohexanedicarboxylic acid-hydroquinone polymerization repeating unit and the 4-hydroxybenzoic acid-4-hydroxybenzoic acid polymerization repeating unit corresponds to 90 mol % or higher.

Example 4: Preparation of Liquid Crystal Polymer Containing Alicyclic Mesogen The polymerization reaction was carried out under the same conditions as in Example 1, except that the amount of 1,4-cyclohexanedicarboxylic acid was changed to 39.60 g, the amount of hydroquinone to 25.30 g, and the amount of 4-hydroxybenzoic acid to 69.09 g.

It was confirmed that the liquid crystal polymer prepared in Example 4 had a melting temperature of 286° C. as measured by a differential scanning calorimeter, a crystallization temperature of 277° C., a flow temperature of 272° C. as measured by a flow tester, and a melt viscosity of 993 poise (shear rate of 1000 $s^{-1}$) as measured with a capillary viscometer.

At this time, with respect to the liquid crystal polymer prepared in Example 4, the total molar content of the 1,4-cyclohexanedicarboxylic acid-hydroquinone polymerization repeating unit and the 4-hydroxybenzoic acid-4-hydroxybenzoic acid polymerization repeating unit corresponds to 90 mol % or higher.

Example 5: Preparation of Liquid Crystal Polymer Containing Alicyclic Mesogen The polymerization reaction was carried out under the same conditions as in Example 1, except that the amount of 1,4-cyclohexanedicarboxylic acid was changed to 30.99 g, the amount of hydroquinone to 19.8 g, and the amount of 4-hydroxybenzoic acid to 82.87 g.

It was confirmed that the liquid crystal polymer prepared in Example 5 had a melting temperature of 325° C. as measured by a differential scanning calorimeter, a crystallization temperature of 282° C., a flow temperature of 300° C. as measured by a flow tester, and a melt viscosity of 23 poise (shear rate of 1000 $s^{-1}$) as measured with a capillary viscometer.

At this time, with respect to the liquid crystal polymer prepared in Example 5, the total molar content of the 1,4-cyclohexanedicarboxylic acid-hydroquinone polymerization repeating unit and the 4-hydroxybenzoic acid-4-hydroxybenzoic acid polymerization repeating unit corresponds to 90 mol % or higher.

Comparative Examples 1 to 5

Comparative Example 1: Wholly Aromatic Liquid Crystal Polymer

SRT-900 resin from Solvay, which was commercialized as an existing wholly aromatic liquid crystal polymer, was used as Comparative Example 1. It was confirmed that the liquid crystal polymer of Comparative Example 1 had a melting temperature of 347° C. as measured by a differential scanning calorimeter, a crystallization temperature of 301° C., a flow temperature of 319° C. as measured by a flow tester, and a melt viscosity of 128 poise (shear rate of 1000 s$^{-1}$) as measured with a capillary viscometer.

Comparative Example 2: Wholly Aromatic Liquid Crystal Polymer

Vectra A950 resin from Celanese, which was commercialized as an existing wholly aromatic liquid crystal polymer, was used as Comparative Example 2. It was confirmed that the liquid crystal polymer of Comparative Example 2 had a melting temperature of 278° C. as measured by a differential scanning calorimeter, a crystallization temperature of 235° C., a flow temperature of 253° C. as measured by a flow tester, and a melt viscosity of 525 poise (shear rate of 1000 s$^{-1}$) as measured with a capillary viscometer.

Comparative Example 3: Preparation of Liquid Crystal Polymer Containing Alicyclic Mesogen The polymerization reaction was carried out under the same conditions as in Example 1, except that a mixture consisting of 14.39 g of 1,4-cyclohexanedicarboxylic acid, 33.63 g of hydroquinone, 42.00 g of 2,6-naphthalenedicarboxylic acid, 57.55 g of 4-hydroxybenzoic acid, and 111.20 g of acetic anhydride was used in a 500 ml glass reactor.

It was confirmed that the liquid crystal polymer prepared in Comparative Example 3 had a melting temperature of 251° C. as measured by a differential scanning calorimeter, a crystallization temperature of 226° C., and a flow temperature of 205° C. as measured by a flow tester.

At this time, with respect to the liquid crystal polymer prepared in Comparative Example 3, the total molar content of the 1,4-cyclohexanedicarboxylic acid-hydroquinone polymerization repeating unit and the 4-hydroxybenzoic acid-4-hydroxybenzoic acid polymerization repeating unit corresponds to less than 90 mol %.

Comparative Example 4: Preparation of Liquid Crystal Polymer Containing Alicyclic Mesogen The polymerization reaction was carried out under the same conditions as in Example 1, except that a mixture consisting of 38.79 g of 1,4-cyclohexanedicarboxylic acid, 54.98 g of hydroquinone, 48.57 g of 2,6-naphthalenedicarboxylic acid, 8.40 g of terephthalic acid, and 108.07 g of acetic anhydride was used in a 500 ml glass reactor.

It was confirmed that the liquid crystal polymer prepared in Comparative Example 4 had a melting temperature of 322° C. as measured by a differential scanning calorimeter, a crystallization temperature of 300° C., and a flow temperature of 293° C. as measured by a flow tester.

Comparative Example 5: Preparation of Liquid Crystal Polymer Containing Alicyclic Mesogen The polymerization reaction was carried out under the same conditions as in Example 1, except that a mixture consisting of 17.90 g of 1,4-cyclohexanedicarboxylic acid, 34.33 g of hydroquinone, 10.70 g of 2,6-naphthalenedicarboxylic acid, 14.80 g of terephthalic acid, 61.54 g of 4-hydroxybenzoic acid, and 115.69 g of acetic anhydride was used in a 500 ml glass reactor.

It was confirmed that the liquid crystal polymer prepared in Comparative Example 5 had a melting temperature of 351° C. as measured by a differential scanning calorimeter and a flow temperature of 260° C. as measured by a flow tester.

At this time, with respect to the liquid crystal polymer prepared in Comparative Example 5, the total molar content of the 1,4-cyclohexanedicarboxylic acid-hydroquinone polymerization repeating unit and the 4-hydroxybenzoic acid-4-hydroxybenzoic acid polymerization repeating unit corresponds to less than 90 mol %.

Experimental Example: Measurement of Physical Properties of Liquid Crystal Polymers Obtained in Examples and Comparative Examples The physical properties of liquid crystal polymers obtained in the examples and comparative examples were measured by the following method, and the results are shown in Table 1.

Experimental Example 1: Measurement of Comparative Tracking Index (CTI)

Test specimens were prepared using the liquid crystal polymers obtained in the examples and comparative examples. The comparative tracking index was measured by a method of dropping standard pollutants on the test specimens according to IEC standard 60112 to measure the maximum voltage at which no tracking was generated by pollutants between two electrodes, and the results are shown in Table 1.

Experimental Example 2: Measurement of Flow Temperature, Melt Temperature, and Crystallization Temperature With respect to the liquid crystal polymers obtained in the examples and comparative examples, the melt temperature (Tm) and the crystallization temperature (Tc) were measured using a differential scanning calorimeter (TA Instruments, Q-20 model) by heating a sample to a temperature of 20° C. higher than the melting temperature at a heating rate of 10° C./min, rapidly cooling it, and again scanning it at a heating rate of 10° C./min. Using a flow tester (Shimadzu, CFT-500Ex), the temperature at which the polymer shows a viscosity of 48,000 poise according to the temperature change under a load of 100 kg/cm' was measured. This temperature is defined as a flow temperature (Tf) having deformation according to temperature under a constant load. The results are shown in Table 1.

TABLE 1

Result of Experimental Examples of Examples and Comparative Examples

| Class | Monomer | CTI | Tf (° C.) | Tm (° C.) | Tc (° C.) |
|---|---|---|---|---|---|
| Example 1 | HBA (20 mol %)/ HNA (4 mol %)/ CHDA (38 mol %)/ HQ (38 mol %) | 0 (650 V or more) | 297 | 329 | 328 |
| Example 2 | HBA (30 mol %)/ HNA (4 mol %)/ CHDA (33 mol %)/ HQ (33 mol %) | 0 (650 V or more) | 287 | 323 | 310 |
| Example 3 | HBA (40 mol %)/ HNA (4 mol %)/ CHDA (28 mol %)/ HQ (28 mol %) | 0 (650 V or more) | 264 | 295 | 281 |
| Example 4 | HBA (50 mol %)/ HNA (4 mol %)/ CHDA (23 mol %)/ HQ (23 mol %) | 0 (650 V or more) | 272 | 286 | 277 |

TABLE 1-continued

Result of Experimental Examples of Examples and Comparative Examples

| Class | Monomer | CTI | Tf (° C.) | Tm (° C.) | Tc (° C.) |
|---|---|---|---|---|---|
| Example 5 | HBA (60 mol %)/ HNA (4 mol %)/ CHDA (18 mol %)/ HQ (18 mol %) | 1 (450 V) | 300 | 325 | 282 |
| Comparative Example 1 | — | 3 (200 V) | 319 | 347 | 301 |
| Comparative Example 2 | — | 3 (200 V) | 253 | 278 | 235 |
| Comparative Example 3 | HBA (42 mol %)/ NDA (19 mol %)/ CHDA (8 mol %)/ HQ (31 mol %) | 2 (250 V) | 205 | 251 | 226 |
| Comparative Example 4 | TPA (5 mol %)/ NDA (22 mol %)/ CHDA (23 mol %)/ HQ (50 mol %) | 2 (250 V) | 293 | 322 | 300 |
| Comparative Example 5 | HBA (45 mol %)/ NDA (5 mol %)/ TPA (9 mol %)/ CHDA(10 mol %)/ HQ (31 mol %) | 2 (300 V) | 260 | 351 | — |

As shown in Table 1, in the case of the liquid crystal polymers of the examples, not only did the comparative tracking index appear as class 0 or class 1, confirming that the polymers had excellent insulation properties, but also the flow temperature (Tf) appeared as 264° C. or higher (specifically, 264° C. to 300° C.) and the melting temperature (Tm) appeared as 286° C. or higher (specifically, 286° C. to 329° C.), confirming that the polymers had excellent flowability and heat resistance. It was further confirmed that the crystallization temperature (Tc) was 277° C. or higher (specifically, 277° C. to 328° C.) which was excellent.

On the other hand, in the case of Comparative Examples 1 and 2, which are typical wholly aromatic liquid crystal polymers among commercially available liquid crystal polymers, the comparative tracking index appeared as class 3, and thus there was a limit to insulation such that they are difficult to be applied to parts for high voltage.

Further, unlike Examples 1 to 5, in the case of the liquid crystal polymers of Comparative Example 3 in which the molar ratio of 1,4-cyclohexanedicarboxylic acid (CHDA) and hydroquinone (HQ) was different and 2,6-naphthalenedicarboxylic acid (NDA) was contained in an excess amount of 4 mol % or higher instead of 6-hydroxy-2-naphthalenecarboxylic acid (HNA), and of Comparative Example 4 in which a part of the dicarboxylic acid was used as terephthalic acid (TPA) without using 4-hydroxybenzoic acid (HBA), the comparative tracking index appeared as class 2 and thus the insulation property decreased. In particular, in the case of the liquid crystal polymer of Comparative Example 3, a flow temperature appeared as 205° C. and a melting temperature appeared as 251° C., and thus the heat resistance decreased.

On the other hand, not only did the liquid crystal polymer of Comparative Example 5 in which 5 mol % of NDA was used and part of CHDA was used as TPA exhibit a comparative tracking index of class 2 and thus showed a decrease in insulation property, but it also had a flow temperature of 260° C. and a melting temperature of 351° C., confirming that the heat resistance was too high.

What is claimed is:

1. A composition for liquid crystal polymer synthesis, comprising:
an alicyclic dicarboxylic acid or its derivative;
an aromatic diol;
an aromatic monocarboxylic acid having 7 to 10 carbon atoms and containing a hydroxyl group; and
an aromatic monocarboxylic acid having 11 to 20 carbon atoms and containing a hydroxyl group,
wherein a molar ratio of the alicyclic dicarboxylic acid or its derivative is 0.9 to 1.1, with respect to 1 mol of the aromatic diol,
wherein a total molar content of the alicyclic dicarboxylic acid or its derivative and the aromatic diol is 46 mol % to 80 mol % based on the overall composition,
wherein a total molar content of the alicyclic dicarboxylic acid or its derivative, the aromatic diol, and the aromatic monocarboxylic acid having 7 to 10 carbon atoms and containing a hydroxyl group is 90 mol % or higher based on the overall composition,
wherein a molar content of the aromatic monocarboxylic acid having 11 to 20 carbon atoms and containing a hydroxyl group is 1 mol % to 6 mol % based on the overall composition,
wherein the alicyclic dicarboxylic acid or its derivative includes a cycloalkane dicarboxylic acid having 5 to 20 carbon atoms or an ester compound thereof,
wherein the alicyclic dicarboxylic acid or its derivative is included in an amount of 33 mol % to 40 mol % based on 100 mol % of the composition for liquid crystal polymer synthesis,
wherein the aromatic diol includes a benzenediol having 6 to 10 carbon atoms,
wherein a liquid crystal polymer prepared by the composition for liquid crystal polymer synthesis has a comparative tracking index rating (as measured according to IEC standard 60112) of class 0, when a test specimen manufactured by a hot press to a size of 35 mm*35 mm*1 mm at a temperature of 20° C. higher than the melting temperature of the polymer is evaluated by a method of dropping standard pollutants on the test specimens according to IEC standard 60112 to measure the maximum voltage at which no tracking was generated by pollutants between two electrodes,
wherein the cycloalkane dicarboxylic acid having 5 to 20 carbon atoms or an ester compound thereof includes at least one of 1,4-cyclohexanedicarboxylic acid, 1,3-cyclohexanedicarboxylic acid, 1,2-cyclohexanedicarboxylic acid, 1,4-dimethylcyclohexane dicarboxylate, 1,3-dimethylcyclohexane dicarboxylate, or 1,2-dimethylcyclohexane dicarboxylate,
wherein the benzenediol having 6 to 10 carbon atoms includes at least one of hydroquinone or resorcinol,
wherein the aromatic monocarboxylic acid having 7 to 10 carbon atoms and containing a hydroxyl group includes 4-hydroxybenzoic acid, and
wherein the aromatic monocarboxylic acid having 11 to 20 carbon atoms and containing a hydroxyl group includes 6-hydroxy-2-naphthalenecarboxylic acid.

2. The composition for liquid crystal polymer synthesis according to claim 1, further comprising one or more additives selected from the group consisting of an impact-reinforcing agent, an antioxidant, a compatibilizer, a hydrolysis stabilizer, an ultraviolet light stabilizer, a heat stabilizer, a coloring additive, a fixing agent, a flame retardant, and an electrically conductive material for loss of static electricity.

* * * * *